(12) United States Patent
Nemoto

(10) Patent No.: US 9,178,971 B2
(45) Date of Patent: Nov. 3, 2015

(54) ELECTRONIC DEVICE

(71) Applicant: KYOCERA CORPORATION, Kyoto (JP)

(72) Inventor: Masayuki Nemoto, Isehara (JP)

(73) Assignee: KYOCERA Corporation, Kyoto (JP)

( * ) Notice: Subject to any disclaimer, the term of this patent is extended or adjusted under 35 U.S.C. 154(b) by 82 days.

(21) Appl. No.: 13/851,095

(22) Filed: Mar. 26, 2013

(65) Prior Publication Data

US 2013/0260826 A1  Oct. 3, 2013

(30) Foreign Application Priority Data

Mar. 27, 2012  (JP) .................................. 2012-072498

(51) Int. Cl.
| | |
|---|---|
| H04M 1/00 | (2006.01) |
| H04M 1/247 | (2006.01) |
| H04M 1/725 | (2006.01) |
| G06F 3/0488 | (2013.01) |
| G06F 3/01 | (2006.01) |
| G06F 3/041 | (2006.01) |

(52) U.S. Cl.
CPC ............. *H04M 1/2477* (2013.01); *G06F 3/016* (2013.01); *G06F 3/0416* (2013.01); *G06F 3/0488* (2013.01); *H04M 1/72519* (2013.01); *G06F 2203/04105* (2013.01); *G06F 2203/04106* (2013.01); *H04M 1/72541* (2013.01)

(58) Field of Classification Search
CPC ... G06F 3/04883; G06F 3/048; G06F 3/0488; G06F 3/0414; G06F 3/044; G06F 3/0482; H04W 12/08

USPC ......... 455/556.1; 345/173, 172, 179; 715/256
See application file for complete search history.

(56) References Cited

U.S. PATENT DOCUMENTS

| | | | | |
|---|---|---|---|---|
| 6,492,979 | B1 * | 12/2002 | Kent et al. ...................... | 345/173 |
| 2003/0189552 | A1 * | 10/2003 | Chuang et al. ................. | 345/173 |
| 2008/0024459 | A1 * | 1/2008 | Poupyrev et al. ............. | 345/173 |
| 2010/0017710 | A1 * | 1/2010 | Kim et al. ...................... | 715/702 |
| 2010/0039393 | A1 * | 2/2010 | Pratt et al. ..................... | 345/173 |
| 2011/0291934 | A1 * | 12/2011 | Yang .............................. | 345/168 |
| 2011/0291976 | A1 | 12/2011 | Takada et al. | |

(Continued)

FOREIGN PATENT DOCUMENTS

| | | | |
|---|---|---|---|
| JP | 2009-033313 | A | 2/2009 |
| JP | 2010-176174 | A | 8/2010 |
| JP | 2010-238222 | A | 10/2010 |
| JP | 2012-053687 | A | 3/2012 |

OTHER PUBLICATIONS

An Office Action; "Notice of Reasons for Rejection," issued by the Japanese Patent Office on Jul. 14, 2015, which corresponds to Japanese Patent Application No. 2012-072498 and is related to U.S. Appl. No. 13/851,095; with English language concise explanation.

*Primary Examiner* — Nathan Taylor
(74) *Attorney, Agent, or Firm* — Studebaker & Brackett PC

(57) ABSTRACT

Erroneous input operations are more surely inhibited than usual erroneous input operations, by an electronic device 1 including a contact detection unit 40, a pressure detection unit 60 and a control unit 10, in a manner that the contact detection unit 40 detects a contact, the pressure detection unit 60 detects a pressure on the contact detection unit 40, the control unit 10 receives an input, and the control unit 10, based on data having already been input, sets a threshold of the pressure for receiving the input.

18 Claims, 6 Drawing Sheets

(56) References Cited

U.S. PATENT DOCUMENTS

| | | | |
|---|---|---|---|
| 2012/0182226 A1* | 7/2012 | Tuli | 345/173 |
| 2012/0188181 A1* | 7/2012 | Ha et al. | 345/173 |
| 2012/0306765 A1* | 12/2012 | Moore | 345/173 |
| 2012/0306766 A1* | 12/2012 | Moore | 345/173 |

* cited by examiner

FIG. 2
(A)
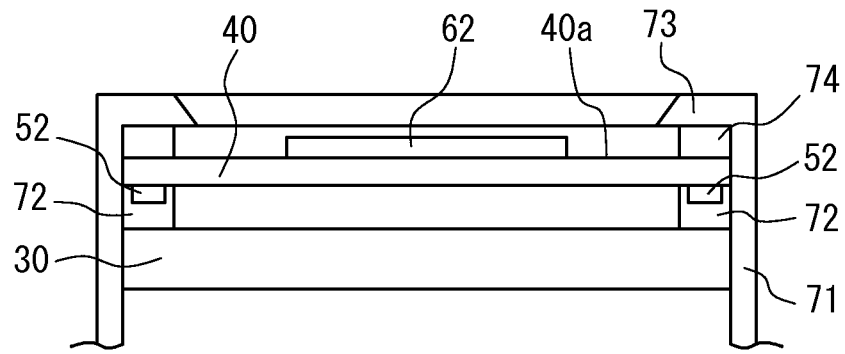
(B)
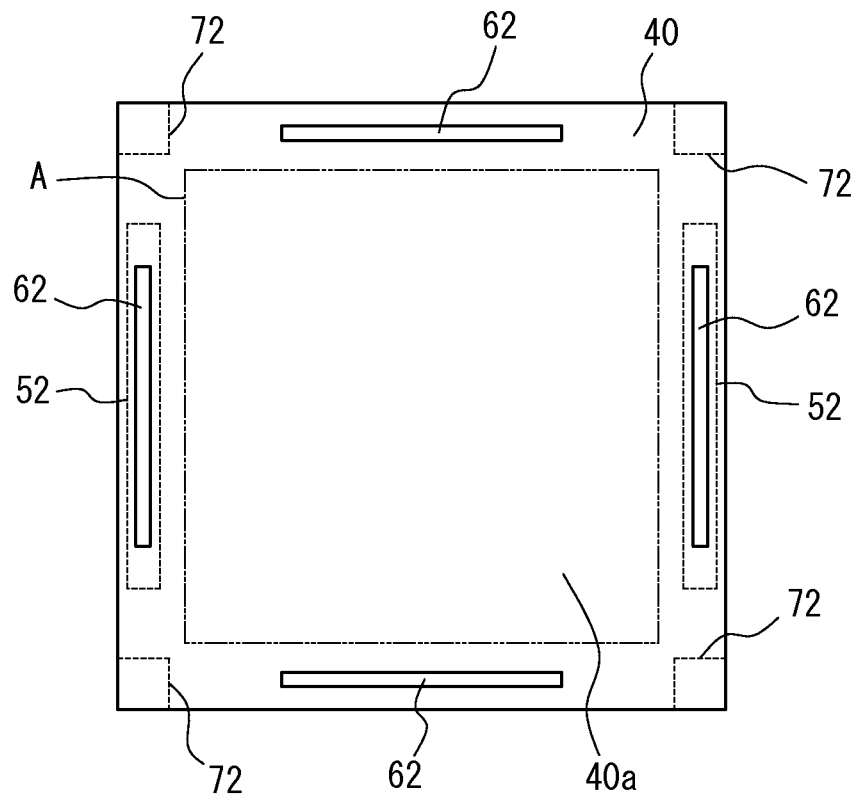

ELECTRONIC DEVICE

CROSS REFERENCE TO RELATED APPLICATION

This application claims priority to and the benefit of Japanese Patent Application No. 2012-072498 (filed on Mar. 27, 2012), the entire content of which is incorporated herein by reference.

FIELD

The embodiment discussed herein relates to an electronic device, for performing predetermined operations such as execution of application software based on an input to a contact detection unit such as a touch sensor.

BACKGROUND

In recent years, electronic devices such as, for example, mobile phone terminals and personal computers for performing various functions based on a variety of inputs by users have been introduced. Some erroneous inputs to such electronic devices may be unfavorable in comparison to usual erroneous inputs.

For example, mobile terminals may make an emergency call such as to the number 110 (see Patent Document 1). Since such an emergency call may have a wide influence, an erroneous operation to make the emergency call needs to be fully inhibited more surely than erroneous operations to make normal calls.

Also, in deleting data such as an address book, an operator accustomed to operation is likely to fail to confirm whether the data are ones the operator wishes to delete. In such a case, the operator may inadvertently delete necessary data while continually pressing a key. Therefore, such an irreversible erroneous operation also needs to be fully inhibited in comparison to usual erroneous input operations.

Patent Document 1: Japanese Patent Laid-Open No. 2009-33313

SUMMARY

Accordingly, in consideration of such conditions, an electronic device capable of inhibiting particular erroneous operations more surely than usual erroneous input operations is provided.

An electronic device according to a first aspect includes:
a contact detection unit configured to detect a contact;
a pressure detection unit configured to detect a pressure on the contact detection unit; and
a control unit configured to receive an input, and set a threshold of the pressure for receiving the input based on data having already been input.

An electronic device according to a second aspect includes:
a contact detection unit configured to detect a contact;
a pressure detection unit configured to detect a pressure on the contact detection unit; and
a control unit configured to receive an input, and change a threshold of the pressure for receiving the input based on data having already been input.

Preferably, the electronic device includes:
a display unit configured to display an object, such that
the control unit receives an input to the object based on the threshold and sets a threshold for receiving an input to the object for confirming execution of a predetermined function to a predetermined value corresponding to the object.

Also preferably, the electronic device includes:
a display unit configured to display an object, such that
the control unit sets a threshold for receiving an input to the object displayed on the display unit to a value corresponding to the object.

Also preferably, the electronic device includes:
a display unit configured to display an object; and
a vibration unit configured to vibrate the contact detection unit, such that
the control unit, when the contact detection unit detects a contact to an object to determine whether to receive the input based on the pressure, vibrates the vibration unit.

For example, an input reception method, as a method substantializing according to an embodiment, includes steps of:
detecting a contact;
detecting a pressure;
setting a threshold of a pressure for receiving an input based on data having already been input; and
receiving the input based on the threshold.

BRIEF DESCRIPTION OF DRAWINGS

FIGS. 2(A) and (B) are diagrams illustrating a housing structure of the electronic device;

DESCRIPTION OF EMBODIMENTS

The electronic device having a configuration described herein may inhibit particular erroneous inputs more surely than usual erroneous input operations.

An embodiment will be described with reference to the accompanying drawings.

Figure 1:
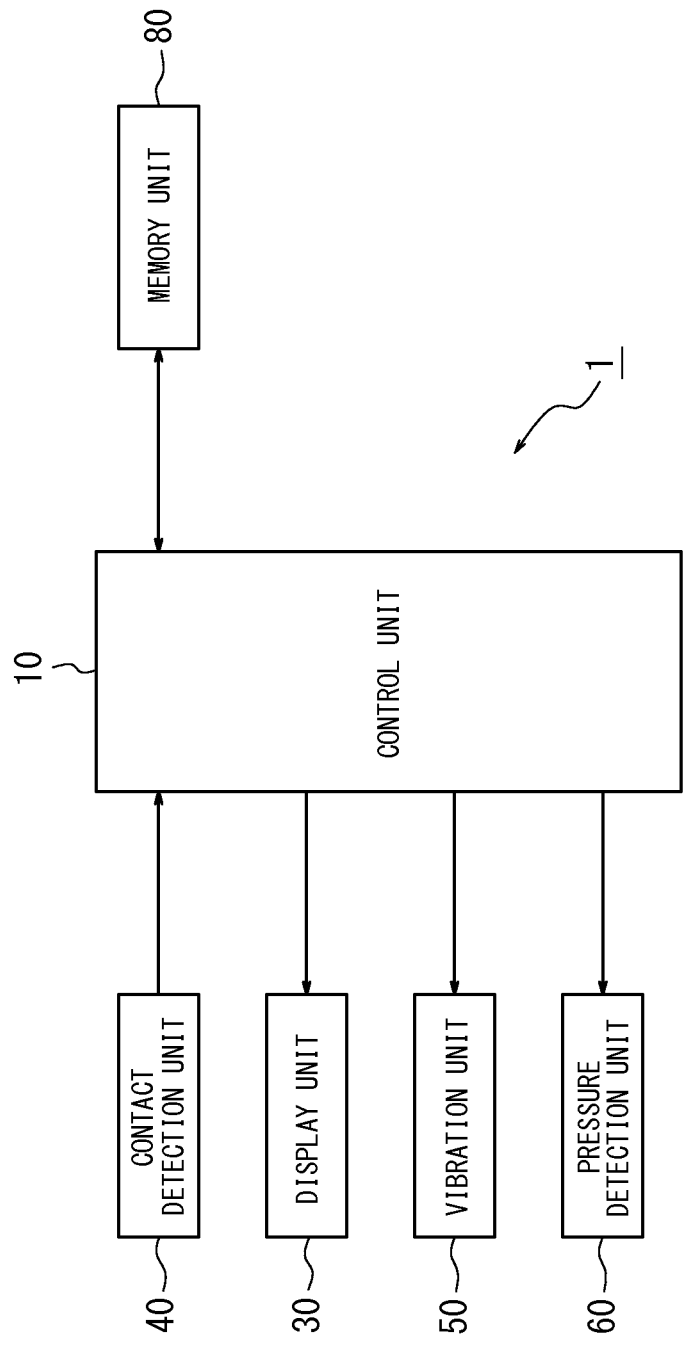
FIG. 1 is a block diagram illustrating a schematic configuration of an electronic device according to one embodiment.

FIG. 1 is a block diagram illustrating a schematic configuration of an electronic device according to the present embodiment.

An electronic device 1 according to the present embodiment is a mobile phone terminal, for example, and includes a control unit 10, a display unit 30, a contact detection unit 40, a vibration unit 50, a pressure detection unit 60 and a memory unit 80, as illustrated in FIG. 1.

The control unit 10 controls each function unit of the electronic device 1, thereby controls and manages overall electronic device 1. Operations of the control unit 10 will be described below.

The display unit 30 displays an image of an object such as, for example, a push button switch (push-type button switch). The object is an image indicating, to an operator, a contact area on a touch face of the contact detection unit 40. The push button switch is a button or a key used for an input operation by the operator (hereinafter, referred to simply as "keys or the like", collectively). The display unit 30 is constituted by using, for example, a liquid crystal display (LCD) panel, an organic EL display panel or the like.

The contact detection unit 40 is normally disposed on a front face of the display unit 30 and detects a contact to the object displayed on the display unit 30 by an operator's finger, a stylus pen and the like (hereinafter, referred to simply as a "contact object", collectively) at a corresponding position on the touch face of the contact detection unit 40. Also, the contact detection unit 40 detects a contact position of the contact object on the touch face and notifies the control unit 10 of the detected contact position. The contact detection unit 40 may include a touch sensor of, for example, a resistive film type, a capacitive type or an optical type.

The vibration unit 50 may include, for example, a piezoelectric vibrator and vibrates the contact detection unit 40. The vibration unit 50 generates vibration in a predetermined vibration pattern such that a tactile sensation is provided to the contact object contacting the touch face. According to the present embodiment, the vibration unit 50 generates vibration based on a driving signal supplied from the control unit 10.

According to the present embodiment, that is, the control unit 10 controls the vibration unit 50 to vibrate. At this time, the control unit 10 may control to change the driving signal for driving the vibration unit 50 based on the contact position of the contact object detected by the contact detection unit 40. That is, the control unit 10 may control such that vibration in a different pattern is generated based on the object displayed on the display unit 30 corresponding to the contact position detected by the contact detection unit 40.

The pressure detection unit 60 detects a pressure on the touch face of the contact detection unit 40 and may include an element such as, for example, a strain gauge sensor or a piezoelectric element whose physical or electric properties (strain, resistance, voltage and the like) changes according to the pressure. When the pressure detection unit 60 is constituted by using, for example, the piezoelectric element or the like, based on a load (force) of the pressure on the touch face of the contact detection unit 40 (or based on a speed (acceleration) of change of the load (force)), the voltage (a value of the voltage (hereinafter, referred to simply as data based on the pressure)) changes as the electric property of the piezoelectric element of the pressure detection unit 60. When the pressure detection unit 60 notifies the control unit 10 of the data based on the pressure or when the control unit 10 detects the data based on the pressure detected by the pressure detection unit 60, the control unit 10 obtains the data based on the pressure. That is, the control unit 10 obtains the data based on the pressure on the touch face of the contact detection unit 40 from the pressure detection unit 60. The data based on the pressure may be, instead of the value of the voltage, a load of the pressure, a value of power, a resistance and the like. Note that the vibration unit 50 and the pressure detection unit 60 may be integrally configured.

The memory unit 80 may include, for example, a flash memory or the like and may store a variety of information as well as various application software (hereinafter, referred to simply as an "application") to be executed by the electronic device 1.

FIG. 2 illustrates diagrams of an example of a housing structure around the display unit 30, the contact detection unit 40, the vibration unit 50 and the pressure detection unit 60. FIG. 2(A) is a cross-sectional view of a main section, and FIG. 2(B) is an elevation view of the main section. As illustrated in FIG. 2(A), the display unit 30 of the electronic device 1 is contained and held in a housing 71. The contact detection unit 40 is disposed on the display unit 30 via insulators 72 made of elastic members. In the electronic device, the contact detection unit 40 is held on the display unit 30 via the insulators 72 arranged at four corners outside a display area A of the display unit 30 indicated by chain double-dashed lines in FIG. 2(B). In FIG. 2, the electronic device 1 includes the display unit 30 and the contact detection unit 40 which are rectangular in shape in a planar view. However, these units may take different shapes according to conditions such as a configuration of the contact detection unit 40 or the display unit 30 of the electronic device.

The housing 71 is provided with an upper cover 73 covering a surface area of the contact detection unit 40 outside the display area of the display unit 30. An insulator 74 made of elastic member is arranged between the upper cover 73 and the contact detection unit 40. The contact detection unit 40 illustrated in FIG. 2 includes a surface member having a touch face 40a constituted by using, for example, a transparent film or the glass, and a rear face member made of the glass or acryl. The contact detection unit 40 is designed such that, when the touch face 40a is pressed down, a pushed part is slightly bent (strained) relative to the pressure or a structure itself is slightly bent.

A strain gauge sensor 62 for detecting a pressure applied on the contact detection unit 40 is provided, adhered or the like, on a surface of the touch sensor 40 at a position close to each periphery covered by the upper cover 73. Further, a piezoelectric vibrator 52 for vibrating the contact detection unit 40 is provided, adhered or the like, on the rear face of the touch sensor 40 at a position close to each of two opposing peripheries. That is, the electronic device 1 illustrated in FIG. 2 has the pressure detection unit 60 illustrated in FIG. 1 including four strain gauge sensors 62 and the vibration unit 50 including two piezoelectric vibrators 52. The vibration unit 50 vibrates the contact detection unit 40, thereby the touch face 40a is vibrated. Note that the housing 71, the upper cover 73 and the insulator 74 illustrated in FIG. 2(A) are omitted in FIG. 2(B).

In the electronic device 1 having the configuration described above, when the control unit 10 obtains the contact position from the contact detection unit 40 and the data from the pressure detection unit 60 while the display unit 30 is displaying the object, the control unit 10 determines whether to receive the input. As described below, the control unit 10 determines whether to receive the input based on the contact position and the data. Further, the control unit 10, based on a received input, controls each function unit of the electronic device 1.

The electronic device 1 may inhibit erroneous inputs by changing a reception determination method for an input under a particular condition. For example, for continual inputs for executing particular functions in response to a plurality of inputs such as calling an emergency number 110 and deleting data stored in the electronic device 1, the electronic device 1 may inhibit erroneous inputs.

Figure 3:
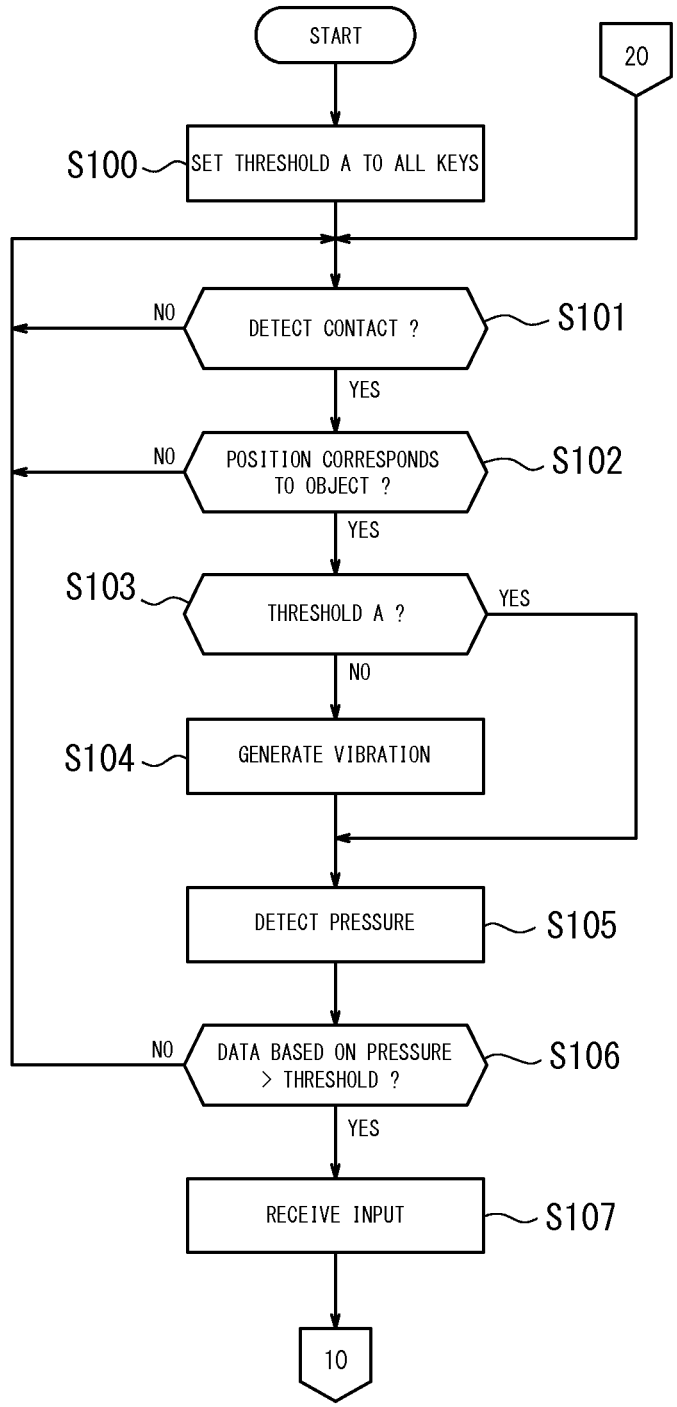
FIG. 3 is a first flowchart illustrating an emergency number call inhibiting operation executed by a control unit.

An emergency number call inhibiting operation executed by the control unit 10 upon input to make an emergency call by the operator will be described with reference to flowcharts in FIGS. 3 and 4. When the display unit 30 displays objects of at least a numerical keypad, a clear key and a call key for allowing for an input of a telephone number, the control unit 10 starts the emergency number call inhibiting operation.

At step S100, the control unit 10, for all keys and the like being displayed, sets a threshold A to be compared to the data based on the pressure for determining whether to receive the input. After setting the threshold, a process proceeds to step S101.

At step S101, the control unit 10 determines whether the contact detection unit 40 has detected a contact. When the contact detection unit 40 has not detected a contact, the process returns to step S101 to repeat the operation at step S101 until a contact is detected. When a contact is detected, the control unit 10 obtains the contact position from the contact detection unit 40 and the process proceeds to step S102.

At step S102, the control unit 10 determines whether the contact position obtained at step S101 corresponds to the object such as the key or the like. When the contact position does not correspond to the object such as the key or the like, the process returns to step S101. When the contact position corresponds to the object such as the key or the like, the process proceeds to step S103.

At step S103, the control unit 10 determines whether the threshold A has been set to the key corresponding to the contact position obtained at step S10. When the threshold A has not been set to the key, the process proceeds to step S104. When the threshold A has been set to the key, the process proceeds to step S105 skipping step S104.

At step S104, the control unit 10 controls the vibration unit 50 to generate vibration. After generation of the vibration, the process proceeds to step S105.

At step S105, the control unit 10 obtains the data based on the pressure from the pressure detection unit 60. After obtainment of the data based on the pressure, the process proceeds to step S106.

At step S106, the control unit 10 determines whether the data based on the pressure obtained at step S105 exceeds the threshold set to the key corresponding to the contact position obtained at step S101. When the data based on the pressure does not exceed the threshold, the process returns to step S101. When the data based on the pressure exceeds the threshold, the process proceeds to step S107.

At step S107, the control unit 10 receives the input to the key corresponding to the contact position obtained at step S101. After reception of the input to the key, the process proceeds to step S108.

Figure 4:
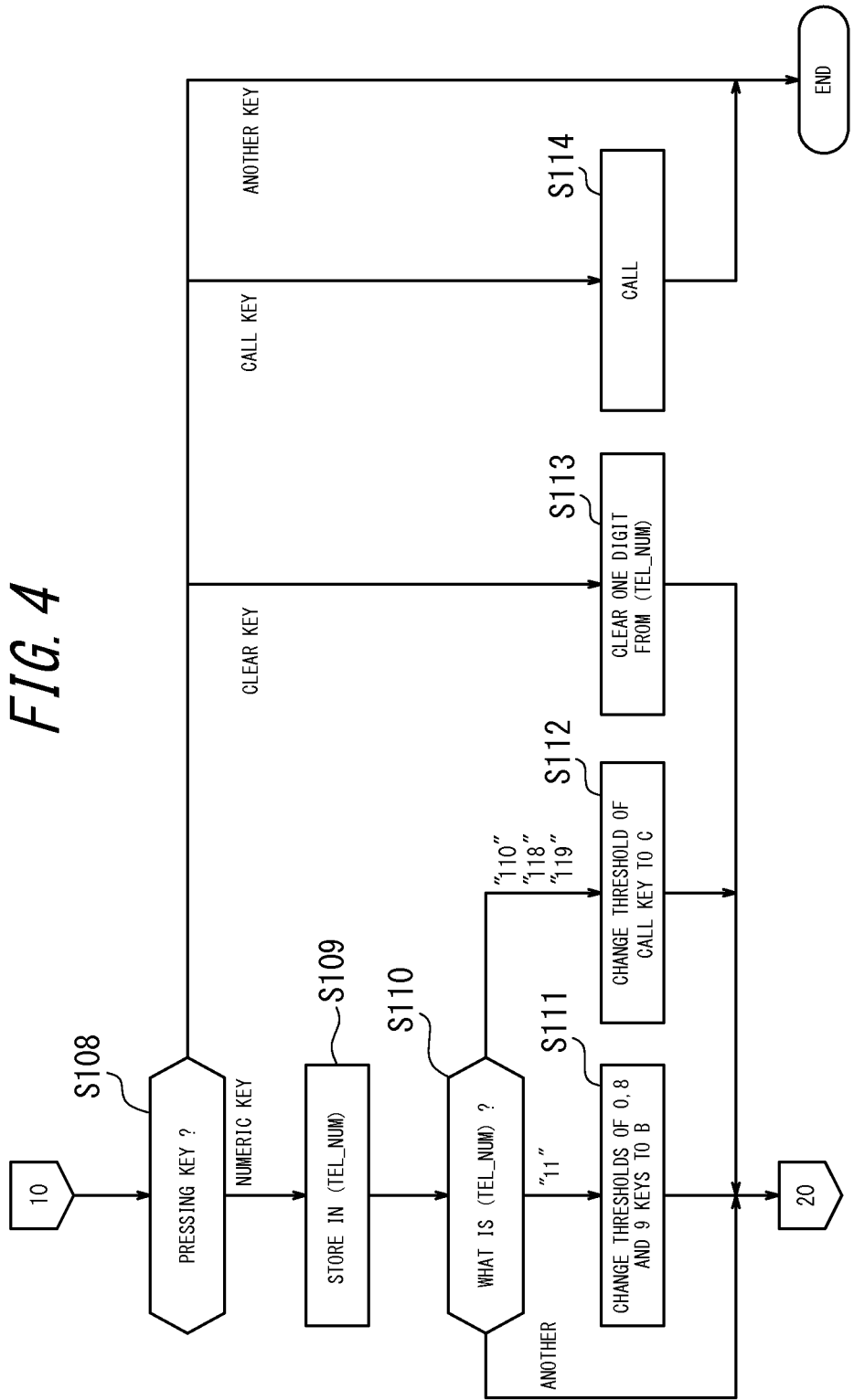
FIG. 4 is a second flowchart illustrating the emergency number call inhibiting operation executed by the control unit.

At step S108, as illustrated in FIG. 4, the control unit 10 determines a type of the key whose input is received at step S107. When the key is a numeric key, the process proceeds to step S109. When the key is the "clear key", the process proceeds to step S113. When the key is the "call key", the process proceeds to step S114. When the key is another key, the emergency number call inhibiting operation is ended.

At step S109, the control unit 10 stores a digit corresponding to the numeric key(s) in a telephone number buffer (TEL_NUM) provided to the control unit 10. The telephone number buffer (TEL_NUM) stores a new digit in addition to digits stored in the past, until reset. After the digits are stored in the telephone number buffer (TEL_NUM), the process proceeds to step S110.

At step S110, the control unit 10 determines the digits stored in the telephone number buffer (TEL_NUM). When the digits stored in the telephone number buffer (TEL_NUM) are "11", the process proceeds to step S111. When the digits stored in the telephone number buffer (TEL_NUM) are any of "110", "118" and "119", the process proceeds to step S112. When the digits stored in the telephone number buffer (TEL_NUM) are neither "110", "118" nor "119", the process returns to step S101.

At step S111, the control unit 10 changes the thresholds of the numeric keys "0", "8" and "9" to a threshold B (A<B). However, the thresholds of other keys are not changed. After change of the thresholds, the process returns to step S101.

At step S112, the control unit 10 changes the threshold of the "call key" to a threshold C (B<C). Also, the control unit 10 restores the thresholds of the numeric keys "0", "8" and "9" to the threshold l[al]A. After change of the thresholds, the process returns to step S101.

As described above, at step S113, to which the process proceeds when the key is determined as the "clear key" at step S108, the control unit 10 deletes the last digit stored in the telephone number buffer (TEL_NUM). After deletion of the digit, the process returns to step S101.

As described above, at step S114, to which the process proceeds when the key is determined as the "call key" at step S108, the control unit 10 controls to call the telephone number stored in the telephone number buffer (TEL_NUM). After calling the telephone number, the emergency number call inhibiting operation is ended.

Figure 5:
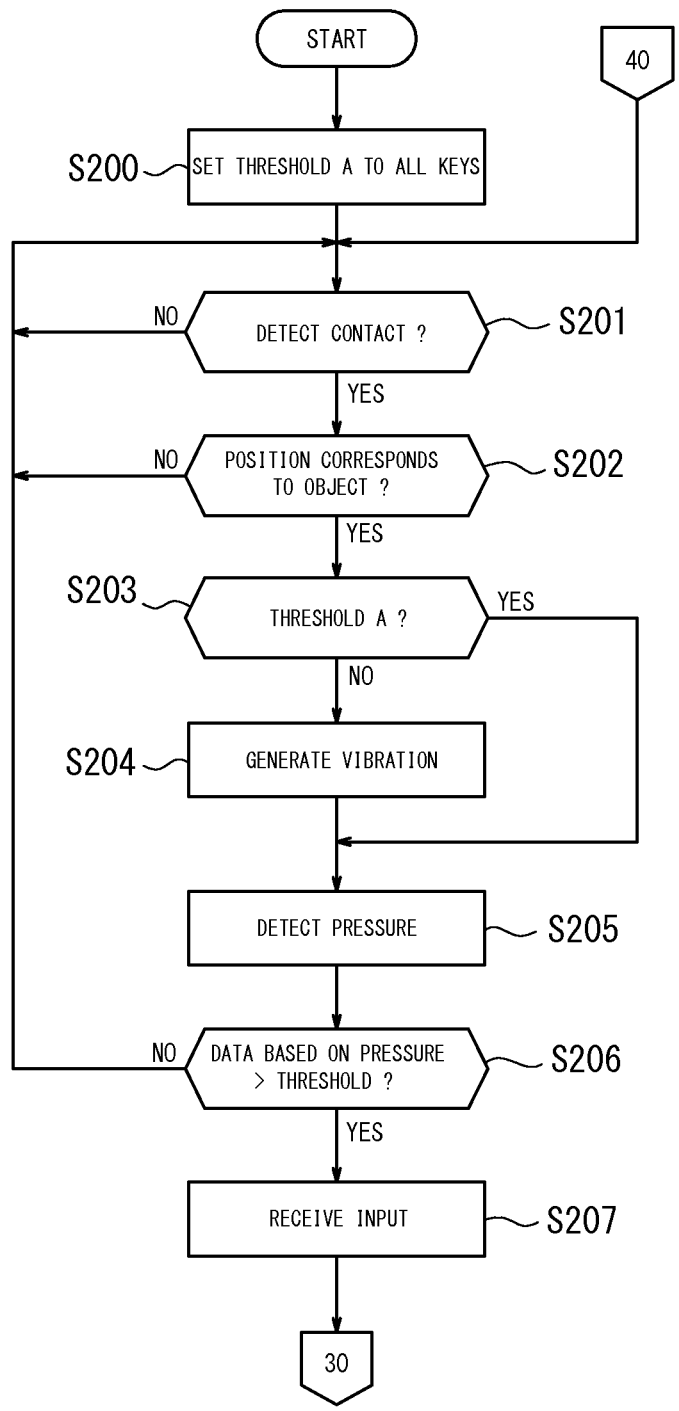
FIG. 5 is a flowchart illustrating a data deletion inhibiting operation executed by the control unit.

A data deletion inhibiting operation executed by the control unit 10 upon an input to delete the data stored in the electronic device 1 will be described with reference to flowcharts in FIGS. 5 and 6. The control unit 10 starts the data deletion inhibiting operation when at least a "delete key" is displayed on the display unit 30 for allowing an input to delete particular data.

From step S200 to step S207, the control unit 10 performs the same operations as those from step S100 to step S107 of the emergency number call inhibiting operation.

Figure 6:
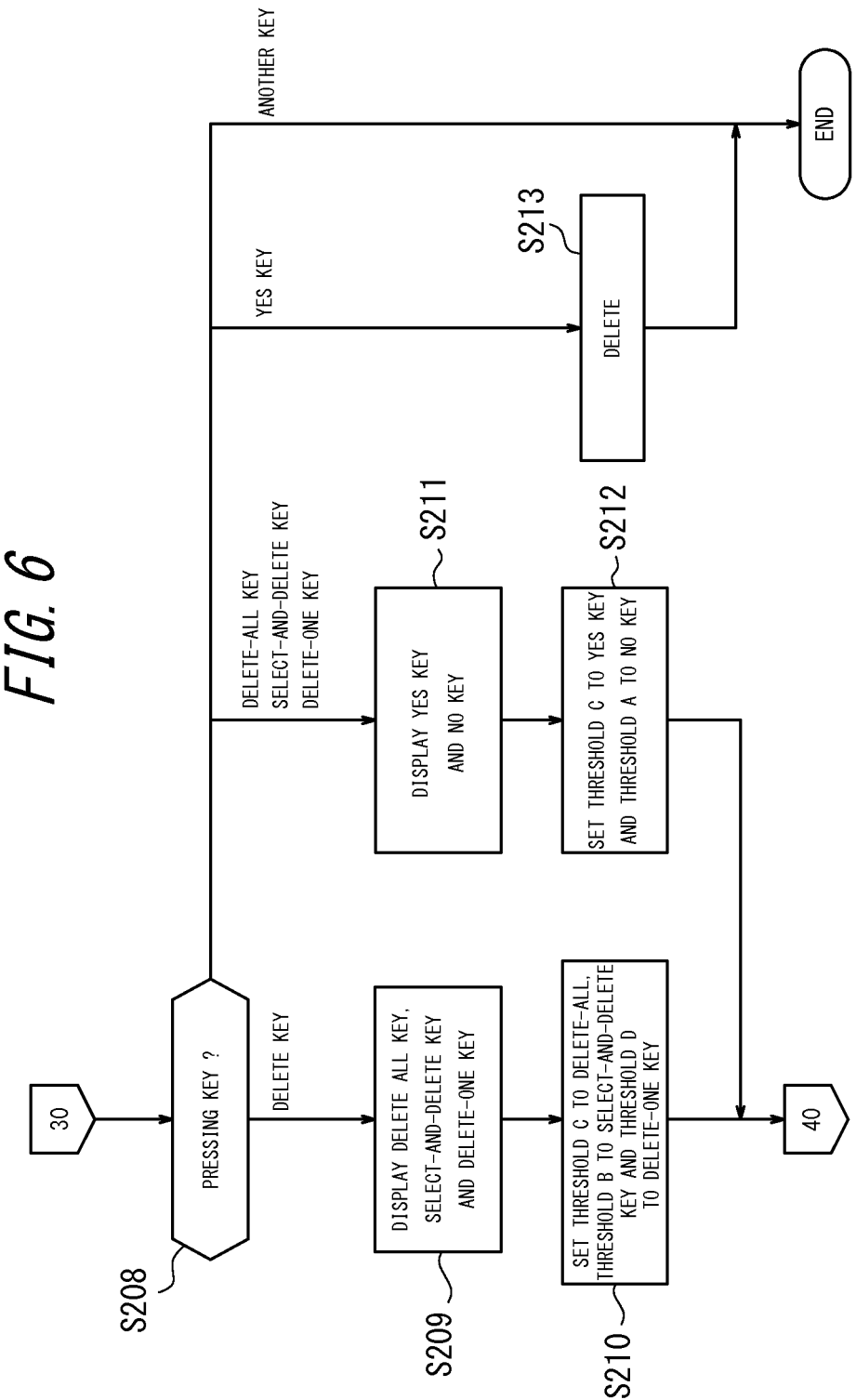
FIG. 6 is a flowchart illustrating the data deletion inhibiting operation executed by the control unit.

At step S208, as illustrated in FIG. 6, the control unit 10 determines the type of the key whose input is received at step S207. When the key is the "delete key", a process proceeds to step S209. When the key is any of a "delete all key", a "select and delete key" or a "delete one key", the process proceeds to step S211. When the key is a "Yes key", the process proceeds to step S213. When the key is another key, the data delete inhibiting operation is ended.

At step S209, the control unit 10 displays objects of the "delete all key", the "select and delete key" and the "delete one key" on the display unit 30. After the objects are displayed, the process proceeds to step S210.

At step S210, the control unit 10 sets the threshold C to the "delete all key", the threshold B to the "select and delete key" and a threshold D to the "delete one key" (A<D<B). After setting of the thresholds, the process returns to step S201.

As described above, at step S211, to which the process proceeds when the key is determined as any of the "delete all key", the "select and delete key" and the "delete one key" at step S208, the control unit 10 displays objects of the "Yes key" and a "No key" on the display unit 30. After the objects are displayed, the process proceeds to step S212.

At step S212, the control unit 10 sets the threshold C to the "Yes key" and the threshold A to the "No key". After setting the thresholds, the process returns to step S201. The thresholds may be appropriately set according to the type of the keys. For example, the threshold C may be set to the delete-all key, the threshold B to the select-and-delete key and the threshold D to the delete-one key.

As described above, at step S213, to which the process proceeds when the key is determined as the "Yes key" at step S208, the control unit 10 deletes the data. After the data are deleted, the data deletion inhibiting operation is ended.

According to the electronic device 1 of the present embodiment having the configuration described above, the threshold of pressure for determining whether to receive the input to a key may be set based on an input having been received in a continual input. Therefore, a strong pressure is required for the input to be received, thus erroneous operations may be inhibited.

According to the electronic device 1 of the present embodiment, also, the threshold of the pressure for determining whether to receive a particular key input based on an input having been received in the continual inputs may be changed from the threshold for a normal input. Accordingly, when whether to receive a normal key input is determined based on the pressure force, a stronger pressure is required for a particular key input than that for the normal key input. Therefore, erroneous operations may be inhibited.

According to the electronic device 1 of the present embodiment, also, for receiving an input to the particular key for executing the predetermined function based on a key whose input has been already received such as calling and deleting in a continual input, the threshold may be set correspondingly to the key. Accordingly, the threshold may be determined to require a strong pressure for executing the predetermined function by the continual input. Therefore, an effect to inhibit erroneous operations may be improved.

According to the electronic device 1 of the present embodiment, also, the thresholds may be set to each of the objects of the keys such as the "delete-all key", "select-and-delete key" and the "delete-one key" being displayed on the display unit 30 in the continual inputs. Therefore, for the keys that cause more serious influence upon erroneous operations, the effect to inhibit the erroneous operations may be improved more.

According to the electronic device 1 of the present embodiment, when a contact to the particular key is detected during the continual input, vibration may be generated. Therefore, the key whose erroneous operation should be inhibited may call the operator's attention by the vibration.

It is to be understood that those who are skilled in the art may easily vary or modify in a multiple manner based on the disclosure herein. Accordingly, such variation and modification are included in a scope of the present invention.

According to the present embodiment, for example, the emergency number call inhibiting operation changes the thresholds when the numbers 110, 118 or 119 are directly input. However, when those numbers are input following numbers such as 184 or 186, which are numbers to be added to the emergency call numbers, the determination on reception of the input according to the present embodiment may be performed. Also, when international roaming is enabled in a foreign country, the determination on reception of the input described above may be performed for emergency call numbers of the country.

Also, the data deletion inhibiting operation according to the present embodiment sets a larger threshold to the key that causes more serious influence upon an erroneous operation thereof. However, the thresholds may be set according to importance of the data such as, for example, whether the data is paid or free.

Although the electronic device 1 according to the present embodiment is the mobile phone terminal, the electronic device 1 is applicable also to various devices for performing a predetermined operation based on an input to the contact detection unit such as a touch panel.

What is claimed is:
1. An electronic device comprising:
a contact detection unit configured to detect a contact;
a pressure detection unit configured to detect a pressure on the contact detection unit; and
a control unit configured to receive an input from at least one particular key or button at a first threshold of the pressure for receiving the input, and to set a second threshold of the pressure for receiving the input, the second threshold of the pressure being higher than the first threshold if a predetermined key or predetermined sequence of keys is pressed.

2. The electronic device according to claim 1, wherein the predetermined key or predetermined sequence of keys corresponds to an initial portion of a sequence of emergency numbers.

3. The electronic device according to claim 2, wherein the at least one particular key is a remaining portion of the sequence of emergency numbers.

4. The electronic device according to claim 1, wherein the predetermined key or predetermined sequence of keys corresponds to a delete key.

5. The electronic device according to claim 4, wherein the at least one particular key is one of a delete-all key, a select-and-delete key, a delete-one key, and a yes key.

6. An electronic device comprising:
a contact detection unit configured to detect a contact;
a pressure detection unit configured to detect a pressure on the contact detection unit; and
a control unit configured to receive an input from at least one particular key or button at a first threshold of the pressure for receiving the input, and to change a second threshold of the pressure for receiving the input, the second threshold of the pressure being higher than the first threshold if a predetermined key or predetermined sequence of keys is pressed.

7. The electronic device according to claim 1, comprising:
a display unit configured to display an object, wherein
the control unit receives an input to the object based on the first threshold and sets the second threshold for receiving the input to the object for confirming execution of a predetermined function to a predetermined value corresponding to the object.

8. The electronic device according to claim 1, comprising:
a display unit configured to display an object, wherein
the control unit sets the first threshold for receiving the input to the object displayed on the display unit to a value corresponding to the object.

9. The electronic device according to claim 1, comprising:
a display unit configured to display an object; and
a vibration unit configured to vibrate the contact detection unit, wherein
the control unit, when the contact detection unit detects a contact to the object to determine whether to receive the input based on the pressure, vibrates the vibration unit.

10. The electronic device according to claim 6, wherein the predetermined key or predetermined sequence of keys corresponds to an initial portion of a sequence of emergency numbers.

11. The electronic device according to claim 10, wherein the at least one particular key is a remaining portion of the sequence of emergency numbers.

12. The electronic device according to claim 6, wherein the predetermined key or predetermined sequence of keys corresponds to a delete key.

13. The electronic device according to claim 12, wherein the at least one particular key is one of a delete-all key, a select-and-delete key, a delete-one key, and a yes key.

14. An input reception method comprising steps of:
detecting a contact;
detecting a pressure;
setting a threshold of a pressure for receiving an input to at least one particular key to a second threshold of the pressure for receiving the input, the second threshold of the pressure being higher than a first threshold of pressure for receiving the input to another key if a predetermined key or predetermined sequence of keys is pressed; and
receiving the input based on the second threshold.

15. The input reception method according to claim 14, wherein the predetermined key or predetermined sequence of keys corresponds to an initial portion of a sequence of emergency numbers.

16. The input reception method according to claim 15, wherein the at least one particular key is a remaining portion of the sequence of emergency numbers.

17. The input reception method according to claim 14, wherein the predetermined key or predetermined sequence of keys corresponds to a delete key.

18. The input reception method according to claim 17, wherein the at least one particular key is one of a delete-all key, a select-and-delete key, a delete-one key, and a yes key.

* * * * *